Figure 1:
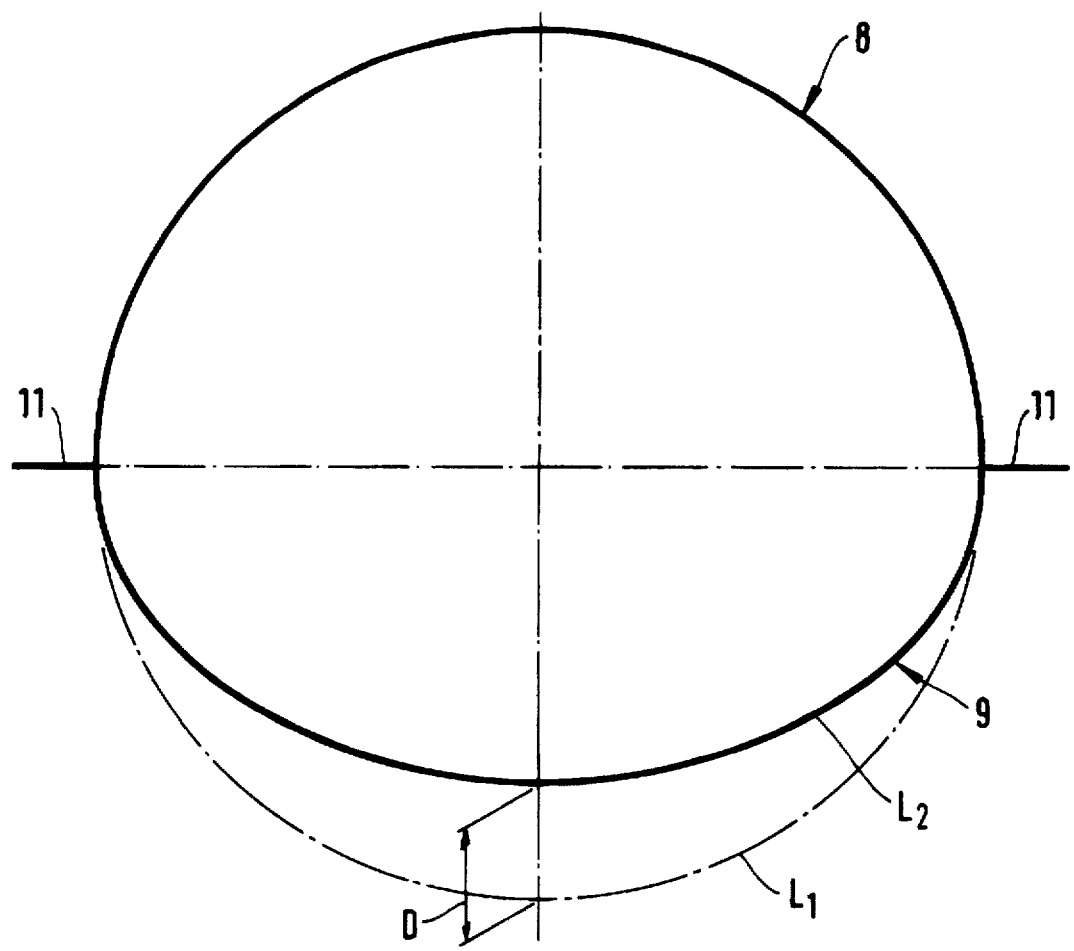

United States Patent [19]

Niegel et al.

[11] Patent Number: 5,788,380
[45] Date of Patent: Aug. 4, 1998

[54] BEARING SHELL AND A RADIAL PLAIN BEARING MOUNTED IN A BEARING CARRYING BODY PROVIDED WITH A BEARING CAP

[75] Inventors: Fritz Niegel; Hjalmar Weiland, both of Oestrich-Winkel, Germany

[73] Assignee: Glyco-Metall-Werke Glyco B.V. & Co. KG, Wiesbaden, Germany

[21] Appl. No.: 716,398

[22] PCT Filed: Mar. 23, 1995

[86] PCT No.: PCT/DE95/00414

§ 371 Date: Aug. 29, 1997

§ 102(e) Date: Aug. 29, 1997

[87] PCT Pub. No.: WO95/27857

PCT Pub. Date: Oct. 19, 1995

[30] Foreign Application Priority Data

Mar. 25, 1994 [DE] Germany ............... 44 10 390.5

[51] Int. Cl.[6] ........................................... F16C 9/00
[52] U.S. Cl. ............................... 384/288; 384/429
[58] Field of Search ........................ 384/288, 284, 384/295, 428, 429, 430, 432, 433, 434

[56] References Cited

U.S. PATENT DOCUMENTS

| | | |
|---|---|---|
| 1,717,873 | 6/1929 | Brush . |
| 3,249,391 | 5/1966 | De Hart et al. . |
| 4,307,921 | 12/1981 | Roberts ............... 384/429 X |
| 4,311,349 | 1/1982 | Roberts ............... 384/288 |
| 4,461,585 | 7/1984 | Mahrus et al. ............... 384/288 |
| 4,488,826 | 12/1984 | Thompson ............... 384/288 |
| 5,181,785 | 1/1993 | Bencini et al. ............... 384/288 |

FOREIGN PATENT DOCUMENTS

| | | |
|---|---|---|
| 1153939 | 3/1958 | France . |
| 698002 | 10/1940 | Germany . |
| 1425125 | 3/1969 | Germany . |
| 3136199 | 3/1983 | Germany . |

*Primary Examiner*—Thomas R. Hannon
*Attorney, Agent, or Firm*—Jon E. Shackelford

[57] ABSTRACT

In order to take account of dimensional variations in crank-cases and connecting rods, the lower bearing shell (9) in the unmounted state is formed such that the outer contour is in the shape of an arc having a radius $r_a$ and the inner contour has the shape of a semi-ellipse having semi-axes $a_i$ and $b_i$. The bearing semi-axis $a_i$ passes through the vertex (19) of the lower bearing shell (9). When the bearing is mounted, the contour of the upper bearing shell (8) remains unchanged while the lower bearing shell (9) is slightly deformed such that its outer contour assumes the shape of a semi-ellipse having semi-axes $a_a$ and $b_a$. The short semi-axis $b_a$ passes through the vertex (19) of the lower bearing shell (9).

8 Claims, 5 Drawing Sheets

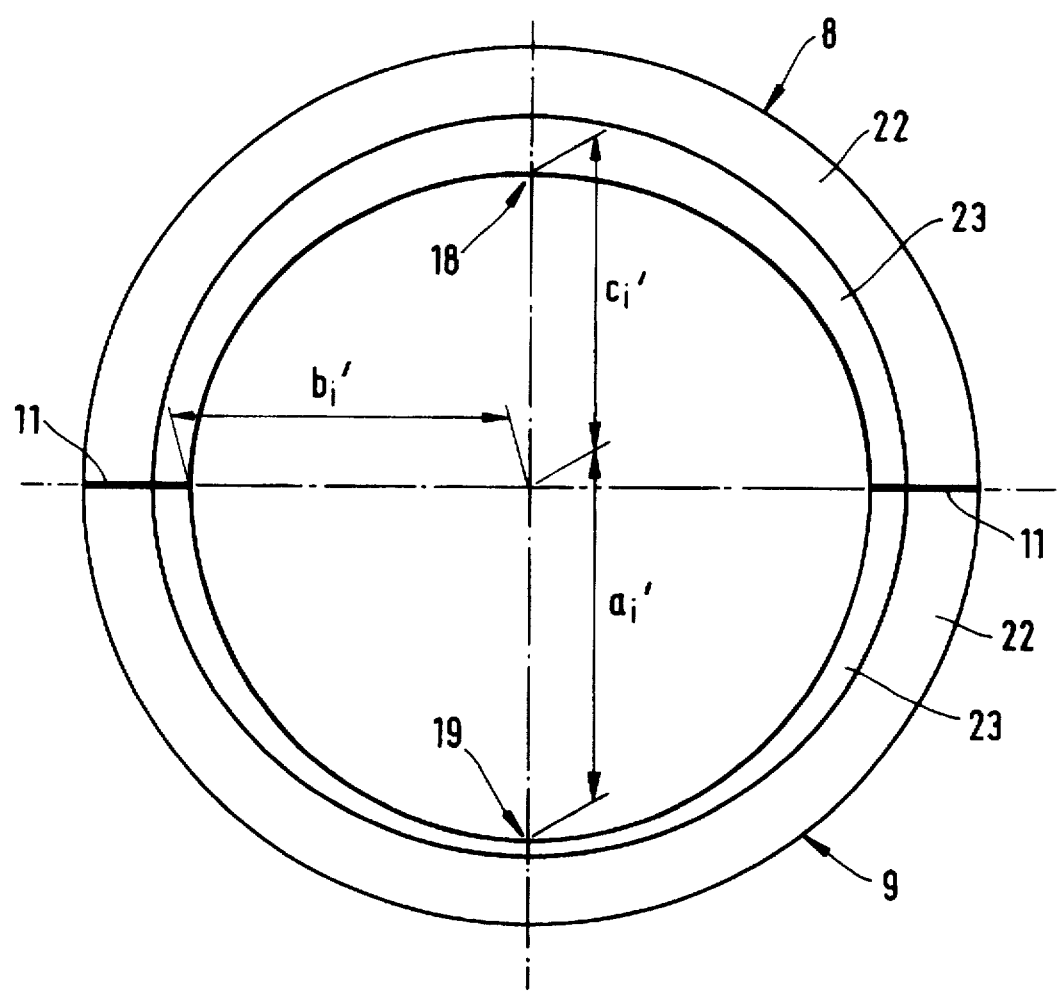

BEARING SHELL AND A RADIAL PLAIN BEARING MOUNTED IN A BEARING CARRYING BODY PROVIDED WITH A BEARING CAP

The invention relates to a bearing shell according to the preamble of claim 1. The invention also relates to a radial plain bearing mounted in a bearing-carrying body provided with a bearing cap, the bearing comprising an upper bearing shell and a lower bearing shell for mounting in internal combustion engines, particularly for the mounting of crankshafts in crankcases and in connecting rods, which are exposed to bearing loading whose magnitude and direction change within a certain cycle, wherein the wall thickness of the lower bearing shell increases from the vertex of the circumference to the joint faces and the inner contour has the shape of a circular arc with the radius $r_i$.

Such radial plain bearings are used, for instance, in car engines, distinction being made between flange bearings, main bearings and connecting rod bearing. The upper bearing shell is that bearing shell which is situated in a crankcase or in a connecting rod, while the lower bearing shell is mounted in the crankcase cap and is screwed to the upper part. For such bearings are required service lives which correspond to the service life of the car engine. In car engines whose service life is more than 100 000 km, the bearings must often be replaced earlier.

Attempts have therefore been made to obtain, by suitable geometry of the bearing, improved lubrication and thereby longer service life.

From DE-OS 14 25 125 are known multi-shell bearings in which the wall thickness of every shell changes along its length, while the center of the inner diameter of each shell is situated eccentrically to the center of the outer diameter of the shell, and the centre of the inner diameter of each shell lies on the bisector of the angle of the shell circumference. In such bearings, which may be composed of two shells only, the surface of the bearing has not a cross-section in the shape of a circular arc, because in all cases the inner diameters of the shells have no common centre. Every bearing shell has therefore its own radius of curvature which causes jumps in wall thickness at the joint faces. If the wall thicknesses in the region of the joint faces are of the same size, then both the shells of the multi-shell bearing have their maximum thickness in the vertex. In this way a kind of lemon-shaped bore is obtained.

A similar bearing, in which the centers are situated with equal spacing on both sides of the joint face in a radial plane which is twisted through an angle out of the plane of main loading, is known from DE-AS 16 75 743.

From DE-OS 31 36 199 is known to provide the part of the bearing which exhibits greater resistance to deformation with a bearing half-shell in the shape of a circular arc, and the part of the bearing which exhibits a smaller resistance to deformation with an oval bearing halfshell. The bearing shell in the shape of a circular arc has a constant wall thickness, whereas the wall thickness of the oval bearing shell decreases towards the joint faces, so that there is a jump in wall thickness in the region of the joint faces.

U.S. Pat. No. 4,311,349 describes a bearing set comprising two identical bearing shells whose wall thicknesses are reduced in the region of joint faces so that also here a kind of lemon-shaped bore is produced.

From U.S. Pat. No. 4,307,921 is known a bearing in which the wall thickness of the shells in the region of one joint face is greater than in the region of the other joint face. The inner contour of the bearing shells is formed by two superimposed bearing bores with offset centers.

U.S. Pat. No. 4,488,826 describes an eccentric bearing bore in which the eccentrically arranged crank journal has on one side a small clearance and on the other side a large clearance. The center of the eccentric bearing bore is displaced to the region of smaller loading, so that the larger clearance provided there may be used for the supply of lubricant. The two bearing shells, which are identical, have in the region of one joint face a greater wall thickness which continuously decreases in the circumferential direction of the shell, so that it is smallest in the region of the other joint face. Because a large clearance should be available in the region of small loading, the joint face does not extend perpendicularly to the longitudinal axis of the connecting rod, which requires an obliquely split connecting rod.

From DE-PS 698002 is known a split plain bearing in which the upper bearing shell is larger than the lower bearing shell, so that the two ends of the upper bearing shell, whose cross-sectional area decreases and which project relative to the bearing-carrying body, provide good centering. To be able to have the corresponding bearing shell stronger in the region of the greatest loading, the whole inner diameter of both the bearing shells is displaced towards the bearing cap eccentrically to the common outer diameter of the two bearing shells which remained unchanged, so that the lower bearing shell has in the region of the vertex a smaller wall thickness than in the region of its joint face.

It was found that no significant increase of the life could be achieved with these known bearings.

The aim of the invention is to devise bearing shells and also a radial plane bearing which has such a long service life that it is probable that it will not have to be changed during the service life of the internal combustion engine.

The aim is achieved with a bearing shell having the features of claim 1. Claim 4 deals with a mounted radial plane bearing.

The bearing receiving bores in crankcases and connecting rods are so provided that the center of the bearing receiving bore coincides with the center of the crank journal of the crankshaft, while between the crank journal and the associated bearing shell is provided a certain clearance. After provision of the bearing receiving bore the cap is screwed off, the bearing shells are inserted and the cap is again screwed on while observing tightening instructions.

The invention is based on the discovery that after the first removal and subsequent screwing on, the cap undergoes a dimensional change, while the region of the bearing bore in the case remains largely unchanged. It was found that these dimensional changes are limited to the vertex region of the cap and are dependent on the shape and the material of the cap. These dimensional changes amount up to 0.1 mm. The dimensional change, which will be hereinafter called dimensional variation of the cap, causes reduction of the clearance between the lower bearing shell and the crankshaft, which leads generally to higher loading of the lower bearing shell and thereby to greater wear, which is ultimately the reason for premature breakdown of the bearing.

This dimensional variation of the cap is according to the invention taken into consideration by specially shaped bearing shells. It is therefore provided that the inner contour of the bearing shell which is mounted in the cap has the shape of a semi-ellipse with semi-axes $a_i$ and $b_i$, wherein the long semi-axis $a_i$ passes through the vertex of the bearing shell.

Because bearing shells are composed of backing material and bearing material, the geometry of the bearing shell is preferably formed by giving the backing material of the bearing shell a constant thickness along the whole circumference while the bearing material, which is deposited on the backing material, has a variable thickness. For outer diameters of bearings of 20 mm to 1000 mm the difference in wall thickness between the vertex and the region of the joint faces is preferably up to 0.1 mm. Because the dimensional variation of the cap is dependent on the material and shape of the cap, the difference in wall thickness must be adapted to these properties of the cap. For this purpose must be, for instance, for every engine type first determined the relevant dimensional variation of the caps.

When such bearing shell is mounted in a crankcase as a lower bearing shell together with an upper bearing shell to provide a radial plane bearing, it is, in view of the dimensional variation of the cap, slightly deformed such that the previously elliptical inner contour changes into a contour in the shape of a circular arc, while simultaneously the outer contour changes from the shape of a circular arc into an elliptical shape. The outer contour of the lower bearing shell assumes the shape of a horizontally situated ellipse, which means that the short semi-axis $b_a$ passes through the vertex of the lower bearing shell and the long semi-axis $a_a$ lies in the plane of the joint faces.

The inner contours of the upper and lower bearing shells lie on a common circle, which corresponds to the circle that would be obtained with two identical bearing shells and without dimensional variation of the cap. In spite of the dimensional variation of the cap, the clearance needed between the bearing shell and the crank journal is fully preserved thanks to the geometry of the lower bearing shell which takes this dimensional variation into consideration, so that there is no additional wear as a consequence of the dimensional variation of the cap.

The lower bearing shell is preferably so shaped that the center of the outer diameter of the upper bearing shell and the center of the inner diameter of the lower bearing shell coincide.

The upper bearing shell may have a constant thickness along the whole circumference. It is also possible that a so-called lemon-shaped bore is superimposed on the bearing bore, so that also the wall thickness of the upper bearing shell in the vertex is greater than in the region of the joint faces.

The same applies also to caps screwed on to connecting rods. In all cases the bearing shells should preferably be mounted such that the joint faces of the bearing shells lie in the splitting plane of the cap.

The wall thickness in the region of the joint faces of the upper and lower bearing shells is preferably identical to avoid jump in thickness in the region of the joint faces.

Considerable increase in operational performance could be achieved without any problems in engines equipped with radial plane bearings according to the invention.

The aforementioned objects, features and advantages of the invention will, in part, be pointed out with particularity and will, in part, become obvious from the following more detailed description of preferred embodiments of the invention, taken in conjunction with the accompanying diagrammatic drawings, which form an integral part thereof.

IN THE DRAWINGS

Figure 2:
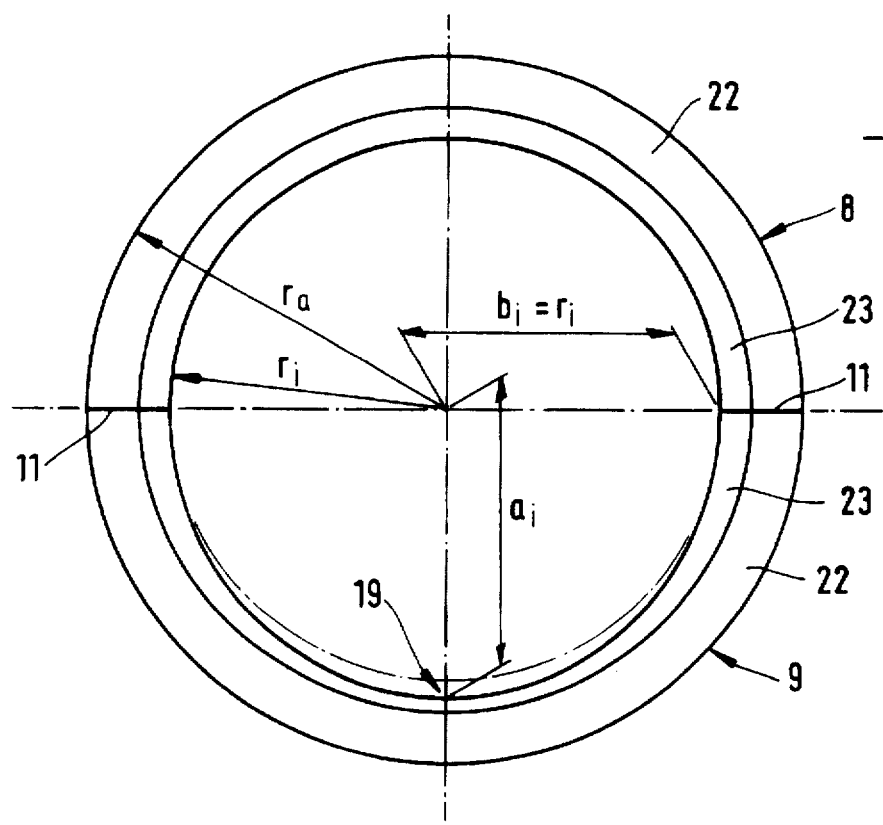
Figure 3:
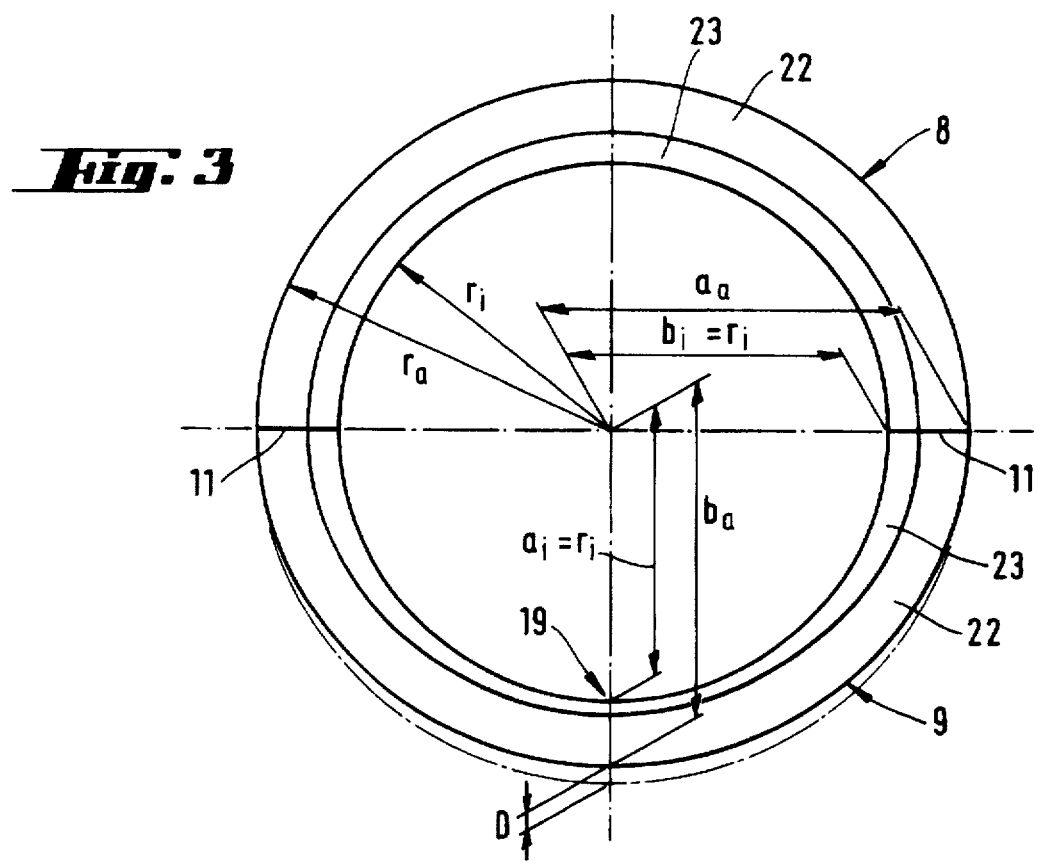
Figure 4:
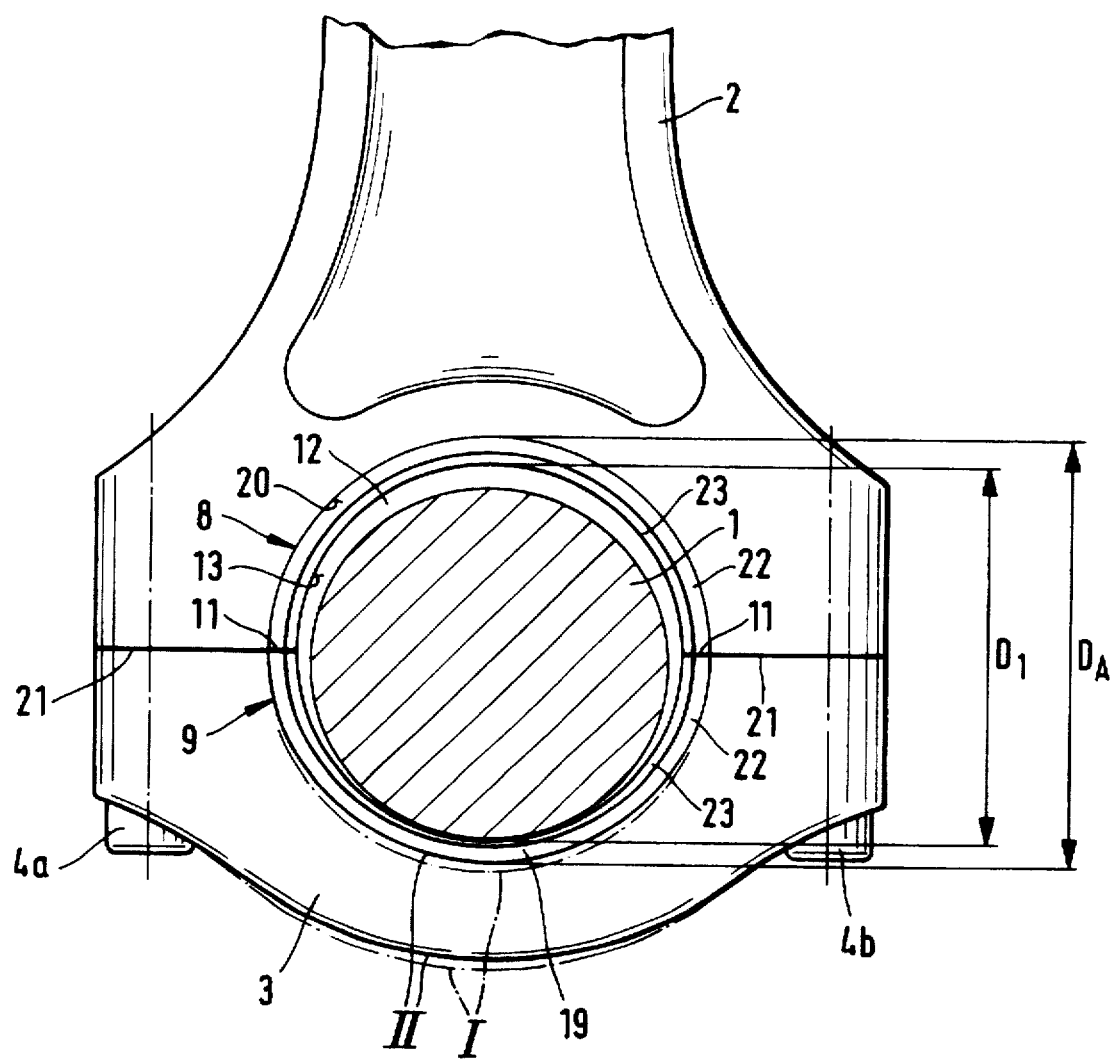
Figure 5:
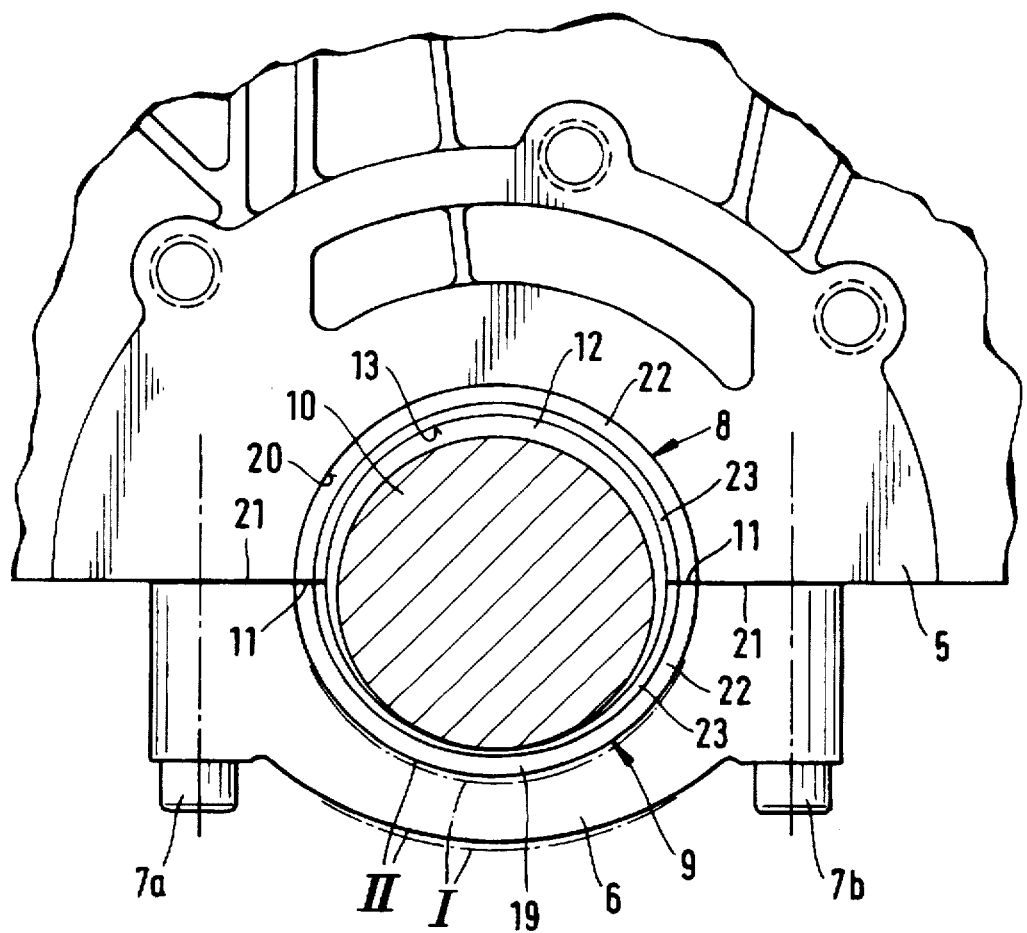

FIG. 1 shows the geometry of a bearing receiving bore,

FIG. 2 is a side elevation of an upper bearing shell and a lower bearing shell before mounting, FIG. 3 is a side elevation of the upper bearing shell and the lower bearing shell shown in FIG. 2 after mounting, FIG. 4 is a front elevation of a-connecting rod with a crank journal in section, FIG. 5 is a front elevation of a crankcase with a main journal in section, and FIG. 6 is a side elevation of an upper bearing shell and a lower bearing shell with a lemon-shaped bore.

IN THE VARIOUS FIGURES OF THE DRAWING, LIKE REFERENCE CHARACTERS DESIGNATE LIKE PARTS OR DIMENSIONS.

FIG. 1 shows diagrammatically the geometry of a bearing receiving bore in a connecting rod or a crankcase, in which $L_1$ describes the circular bearing receiving bore after the crankcase or connecting rod have been machined in a boring machine.

When the cap, which forms the lower half of the bearing receiving bore, is unscrewed and subsequently, after mounting of the bearing shells, attached again while observing the tightening instructions, the inner contour changes due to the dimensional variations of the cap. After the mounting of the bearing, the bearing receiving bore is described by the curve $L_2$, which has the shape of a horizontally extending ellipse. The reduction of the diameter of the bearing receiving bore in the region of the vertex is caused by the dimensional variations D of the cap.

In FIG. 2 are shown two bearing shells 8, 9 in unmounted state. The upper bearing shell 8 and also the lower bearing shell 9 comprise backing material 22 on which is deposited bearing material 23. The upper bearing shell 8 has a constant wall thickness along the whole circumference. The lower bearing shell 9 has in the vertex 19 a smaller wall thickness than in the region of the joint faces 11, where the wall thickness corresponds to that of the upper bearing shell 8. The reduction of wall thickness in the region of the vertex is at the expense of the bearing material 23, so that the backing material 22 has a constant thickness along the whole circumference. The inner contour of the lower bearing shell has the shape of a standing semi-ellipse, which means that the long semi-axis $a_i$ passes through the vertex 19 of the lower bearing shell, while the short semi-axis $b_i$ is situated in the plane of the joint faces 11 and equals the radius $r_i$ of the inner diameter of the upper bearing shell 8.

When the bearing shells 8, 9 are mounted in a crankcase, the shape of the upper bearing shell 8 remains unchanged but the lower bearing shell 9 is slightly deformed due to the dimensional variations of the cap. Neither the case nor the cap are shown in FIG. 3. The dimensional variation of the cap causes in the region of the vertex 19 shortening of the long semi-axis $a_i$ or of the radius $r_a$ of the outer diameter of the lower bearing shell 9. This shortening causes that the previously elliptical inner contour of the lower bearing shell changes now to an inner contour in the shape of a circular arc and, as a consequence, the long semi-axis $a_i$ has now the value of the radius $r_i$ of the inner diameter of the upper bearing shell 8. Due to the different wall thickness of the lower bearing shell 9, the outer contour of the lower bearing shell 9, which had previously the shape of a circular arc, changes simultaneously into the shape of a horizontally situated ellipse whose short semi-axis $b_a$ passes through the vertex 19 and whose long semi-axis $a_a$ is situated in the plane of the joint faces 11 and is equal to the radius $r_a$ of the outer diameter of the upper bearing shell 8.

In FIG. 4 is shown a connecting rod 2 with a cap 3 screwed thereto by screws 4a,b. In the bearing receiving bore 20 are mounted the upper and lower bearing shells 8, 9 in such a way that the joint faces 11 are situated in the plane 21 of the cap 3. The shape of the outer and inner contour of the cap 3 after mounting in the bearing receiving bore 20 is illustrated by chain-dotted curves I. After the mounting of the bearing, the cap changed in the vertex 19 and the new inner and outer contour of the cap is now described by the curves II. So as to make up for the dimensional variations D of the cap (see FIG. 1), the wall thickness of the lower bearing shell 9 is in the vertex 19 correspondingly reduced. The wall thickness of the lower bearing shell 9 decreases continuously from the joint faces 11 to the vertex 19.

So as to avoid jumps in wall thickness, the wall thickness of the lower bearing shell 9 in the region of the joint faces 11 is equal to the wall thickness of the upper bearing shell 8 which has a constant wall thickness along the whole circumference.

The crank journal 1, which did not change its position due to the reduced wall thickness of the lower bearing shell 9, lies now on the lower bearing shell without clearance.

The bearing clearance 12 between the upper bearing shell 8 and the crank journal 1 could remain unchanged. As a consequence of the reduced wall thickness of the lower bearing shell 9 the total outer diameter $D_A$ of both the bearing shells 8, 9 was reduced by the dimensional variation D of the cap, whereas the diameter $D_I$ of the bearing bore 13 remained unchanged.

In FIG. 5 is shown a crankcase 5 with a cap 6 attached by screws 7a,b. Also in this embodiment the shape of the cap 6 before and after mounting of the bearing shells 8, 9 and the journal 10 is represented by the curves I and II. The shapes of the bearing shells 8, 9 correspond to those described in connection with FIGS. 2 to 4.

In FIG. 6 are shown two bearing shells 8, 9 in unmounted state. This embodiment differs from that in FIG. 2 in that on the bearing bore having the bearing geometry according to the invention is superimposed a lemon-shaped bore. The geometry of the lower bearing shell 9 is only slightly changed compared to that shown in FIG. 2. The ellipse describing the inner contour of the lower bearing shell is preserved, while for the semi-axes applies: $a_i' < a_i$, $b_i' > b_i$ and $a_i' > b_i'$. The largest change is experienced by the upper bearing shell 8 whose wall thickness is now greatest in the vertex 18 and decreases towards the joint faces 11. In the embodiment illustrated herein the backing material 22 has a constant thickness and the bearing material has a variable thickness. The lemon-shaped bore causes that the inner contour of the upper bearing shell 8 has the shape of a horizontal ellipse with a long semi-axis $b_i'$ and a short semi-axis $c_i'$.

Obviously, numerous modifications and variations of the present invention are possible in the light of the above teachings. It is therefore to be understood that within the scope of the appended claims, the invention may be practised otherwise than as specifically described herein.

We claim:

1. A bearing shell having an outer contour in the shape of a circular arc with a radius $r_a$, with a vertex and a pair of joint end faces, and having a wall thickness which increases from said vertex in a circumferential direction to said joint end faces, such that said shell comprises an inner contour in the shape of a semi-ellipse with long and short semi-axes $a_i$ and $b_i$, and wherein the long semi-axis $a_i$ passes through said vertex.

2. The bearing shell according to claim 1, and further comprising a backing material having a constant thickness along the whole circumference of said bearing shell and bearing material deposited on the backing material with a variable thickness.

3. The bearing shell according to claim 1, comprising an outer diameter of 20 mm to 1000 mm and wherein the difference in said wall thickness between the wall at said vertex and at said joint faces is up to 0.1 mm.

4. A radial plain bearing mounted in a bearing-carrying body provided with a bearing cap, the bearing comprising an upper bearing shell and a lower bearing shell each defining a vertex and a pair of joint faces wherein the lower bearing shell comprises a wall thickness which increases from its vertex circumferentially to its joint faces, and the lower bearing shell comprises an inner contour having the shape of a circular arc with a radius $r_i$ and an outer contour having the shape of a semi-ellipse with long and short semi-axes $a_a$ and $b_a$, and wherein the short semi-axis $b_a$ passes through the vertex of the lower bearing shell.

5. The radial plain bearing according to claim 4, wherein the outer diameter of the upper bearing shell and of the inner diameter of the lower bearing shell are centered on a common center point.

6. The radial plain bearing according to claim 4, wherein the wall thickness of the upper bearing shell and the wall thickness of the lower bearing shell at the joint faces is the same.

7. The radial plain bearing according to claim 4, wherein the wall thickness at the vertex of the upper bearing shell is greater than the wall thickness in the region of the joint faces.

8. The radial plain bearing according to claim 4, wherein the bearing shells are each provided with a thrust flange.

* * * * *